(12) United States Patent
Yoon et al.

(10) Patent No.: US 12,438,212 B2
(45) Date of Patent: Oct. 7, 2025

(54) BATTERY PACK HAVING THERMAL DIFFUSION PREVENTION STRUCTURE BETWEEN BATTERY MODULES

(71) Applicant: LG Energy Solution, LTD., Seoul (KR)

(72) Inventors: Doo-Han Yoon, Daejeon (KR); Jin-Kyu Lee, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 776 days.

(21) Appl. No.: 17/780,453

(22) PCT Filed: Aug. 5, 2021

(86) PCT No.: PCT/KR2021/010363
§ 371 (c)(1),
(2) Date: May 26, 2022

(87) PCT Pub. No.: WO2022/055130
PCT Pub. Date: Mar. 17, 2022

(65) Prior Publication Data
US 2023/0011587 A1    Jan. 12, 2023

(30) Foreign Application Priority Data

Sep. 14, 2020  (KR) .................. 10-2020-0117919

(51) Int. Cl.
*H01M 10/653*  (2014.01)
*H01M 10/613*  (2014.01)
(Continued)

(52) U.S. Cl.
CPC ....... *H01M 10/653* (2015.04); *H01M 10/613* (2015.04); *H01M 10/625* (2015.04);
(Continued)

(58) Field of Classification Search
CPC ............. H01M 50/249; H01M 50/293; H01M 50/211; H01M 50/242; H01M 50/204;
(Continued)

(56) References Cited

U.S. PATENT DOCUMENTS

| | | |
|---|---|---|
| 2010/0136404 A1 | 6/2010 | Hermann et al. |
| 2011/0159340 A1 | 6/2011 | Hu et al. |
| 2015/0280190 A1 | 10/2015 | Ohshiba et al. |
| 2017/0194680 A1* | 7/2017 | Muck .................. H01M 50/264 |
| 2019/0006642 A1 | 1/2019 | Sakaguchi et al. |

(Continued)

FOREIGN PATENT DOCUMENTS

| | | |
|---|---|---|
| CN | 205231210 U | 5/2016 |
| CN | 105914427 A | 8/2016 |

(Continued)

*Primary Examiner* — Eugenia Wang
(74) *Attorney, Agent, or Firm* — Bryan Cave Leighton Paisner LLP (57) ABSTRACT

A battery pack includes: a plurality of battery modules including a plurality of battery cells and a housing accommodating the plurality of battery cells; a case accommodating the plurality of battery modules; a plurality of insulating materials arranged between two battery modules facing each other among the plurality of battery modules; and a thermally conductive sheet having one side positioned between the insulating materials and the other side in contact with the case.

11 Claims, 6 Drawing Sheets

(51) Int. Cl.
  *H01M 10/625*   (2014.01)
  *H01M 10/647*   (2014.01)
  *H01M 10/6555*  (2014.01)
  *H01M 10/658*   (2014.01)
  *H01M 50/204*   (2021.01)
  *H01M 50/211*   (2021.01)
  *H01M 50/242*   (2021.01)
  *H01M 50/249*   (2021.01)
  *H01M 50/291*   (2021.01)
  *H01M 50/293*   (2021.01)

(52) U.S. Cl.
  CPC ..... *H01M 10/647* (2015.04); *H01M 10/6555* (2015.04); *H01M 10/658* (2015.04); *H01M 50/204* (2021.01); *H01M 50/211* (2021.01); *H01M 50/242* (2021.01); *H01M 50/249* (2021.01); *H01M 50/291* (2021.01); *H01M 50/293* (2021.01); *H01M 2220/20* (2013.01)

(58) Field of Classification Search
  CPC ............ H01M 50/244; H01M 50/289; H01M 50/291; H01M 50/20; H01M 50/24; H01M 50/258; H01M 10/647; H01M 10/653; H01M 10/625; H01M 10/6555; H01M 10/658; H01M 10/613; H01M 2220/20; Y02E 60/10
  See application file for complete search history.

(56) References Cited

U.S. PATENT DOCUMENTS

| | | | |
|---|---|---|---|
| 2019/0013556 | A1 | 1/2019 | Sakaguchi et al. |
| 2020/0243935 | A1 | 7/2020 | Morita et al. |
| 2020/0365855 | A1 | 11/2020 | Murayama et al. |
| 2022/0320624 | A1* | 10/2022 | Kuramitsu .......... H01M 10/613 |

FOREIGN PATENT DOCUMENTS

| | | |
|---|---|---|
| CN | 108258167 A | 7/2018 |
| EP | 3654446 A1 | 5/2020 |
| EP | 4024573 A1 | 7/2022 |
| JP | H04135162 | 12/1992 |
| JP | 2011165390 A | 8/2011 |
| JP | 2012124319 | 6/2012 |
| JP | 2012164463 A | 8/2012 |
| JP | 2012204129 | 10/2012 |
| JP | 2014183013 A | 9/2014 |
| JP | 2015195136 | 11/2015 |
| JP | 2017021996 A | 1/2017 |
| JP | 201837157 | 3/2018 |
| JP | 201967583 | 4/2019 |
| JP | 2019147357 | 9/2019 |
| JP | 2019-172762 A | 10/2019 |
| JP | 2020-119764 A | 8/2020 |
| KR | 10-2016-0041411 A | 4/2016 |
| WO | 2012133707 | 10/2012 |
| WO | 2017-159527 A1 | 9/2017 |
| WO | 2019-167689 A1 | 9/2019 |

* cited by examiner

BATTERY PACK HAVING THERMAL DIFFUSION PREVENTION STRUCTURE BETWEEN BATTERY MODULES

CROSS-REFERENCE TO RELATED APPLICATIONS

This application is a US national phase of international application No. PCT/KR2021/010363 filed on Aug. 5, 2021, and claims priority to Korean Patent Application No. 10-2020-0117919 filed on Sep. 14, 2020, the disclosures of which are incorporated by reference as if fully set forth herein.

TECHNICAL FIELD

The present disclosure relates to a battery pack including two or more battery modules, and more particularly, to a battery pack having a thermal diffusion prevention structure for effectively preventing propagation of heat generated from any one battery module to other battery modules in the vicinity.

BACKGROUND

A battery that converts electric energy into chemical energy and is repeatedly chargeable or dischargeable is called a secondary battery, to distinguish the same from a primary battery which cannot be used again after one use.

Examples of the secondary battery include lithium secondary batteries, nickel-cadmium (Ni—Cd) batteries, lead storage batteries, nickel-hydrogen (Ni-MH) batteries, zinc-air batteries, and alkaline manganese batteries. Among these, lead storage batteries and lithium secondary batteries are the most actively commercialized secondary batteries.

In particular, lithium secondary batteries have advantages such as high energy storage density, light weight and compact size, high safety, low discharge rate, and long lifespan, and thus are widely used as a batteries for electric vehicles. For reference, lithium secondary batteries are generally classified into cylindrical, prismatic, and pouch types according to their manufacturing type, and their use ranges from batteries for electric vehicles to batteries for energy storage systems (ESS) and other electric devices.

Currently, however, it is difficult to obtain sufficient output from a single lithium secondary battery (cell) to drive an electric vehicle. In order to use a secondary battery as an energy supply for an electric vehicle, a battery module in which a plurality of lithium-ion battery cells are connected in series and/or in parallel is to be configured. In general, a battery pack is configured, in which the battery modules are connected in series and which includes a battery management system (BMS) that functionally retains the battery modules, a cooling system, a battery disconnection unit (BDU), an electric wiring cable, or the like.

Since secondary batteries involve a chemical reaction during charging and discharging, performance thereof may decrease when the secondary batteries are used in an environment that has a higher temperature than the appropriate temperature, and there is a risk of ignition or explosion if the temperature rises significantly above the appropriate temperature. In a battery module having a structure in which the secondary batteries described above are intensively accommodated in a housing, heat emitted from the secondary batteries may be combined to increase the temperature of the battery module even more rapidly and significantly.

Moreover, a battery pack includes a plurality of battery modules, and heat may be generated due to an abnormal situation occurring in some battery modules or in secondary batteries among those secondary batteries constituting the battery module, and the heat may continuously increase the temperature of the corresponding battery module to be higher than a certain threshold temperature, causing even other battery modules in the vicinity to undergo a thermal runaway. If such heat or thermal runaway is not properly controlled, the safety of the battery pack cannot be guaranteed.

SUMMARY

The present disclosure is designed to solve the problems of the related art, and therefore the present disclosure is directed to providing an insulation and heat dissipation structure for effectively preventing propagation of thermal runaway caused by heat generated in some battery modules among a plurality of battery modules, to other battery modules in the vicinity.

However, the technical objectives to be solved by the present disclosure are not limited to the above ones, and other objectives not mentioned herein will be clearly understood by those skilled in the art from the description of the present disclosure given below.

In one aspect of the present disclosure, there is provided a battery pack including a plurality of battery modules including a plurality of battery cells and a housing accommodating the plurality of battery cells, a case accommodating the plurality of battery modules, a plurality of insulating materials arranged between two battery modules facing each other among the plurality of battery modules, and a thermally conductive sheet having one side arranged between the insulating materials and the other side provided to be in contact with the case.

The case may include a heat transfer material on an inner surface thereof, and the thermally conductive sheet may include a heat dissipating portion having a bent upper portion to be in surface contact with the inner surface of the case.

When the two battery modules facing each other are specified as a first battery module and a second battery module, the insulating materials may include a first insulation pad provided to surround one side of the first battery module and a portion of an upper surface thereof, a second insulation pad provided to surround one side of the second battery module and a portion of an upper surface thereof, and a third insulation pad arranged between the first insulation pad and the second insulation pad.

The thermally conductive sheet may include a first thermally conductive sheet arranged between the first insulation pad and the third insulation pad, and a second thermally conductive sheet arranged between the second insulation pad and the third insulation pad.

The first thermally conductive sheet and the second thermally conductive sheet may be provided to be symmetrical to each other.

The first thermally conductive sheet may include a first heat absorbing portion that is in contact with one surface of the first insulation pad and one surface of the third insulation pad and a first heat dissipating portion that is in contact with an upper surface of the first insulation pad and the inner surface of the case, and the second thermally conductive sheet may include a second heat absorbing portion that is in contact with one surface of the second insulation pad and the other surface of the third insulation pad and a second heat dissipating portion that is in contact with an upper surface of the second insulation pad and the inner surface of the case.

The thermally conductive sheet may include a material having a thermal conductivity of 200 W/mk or more.

The thermally conductive sheet may include at least one material of aluminum (Al) and graphite.

The housing may include a top plate and a bottom plate which form an upper portion and a lower portion, respectively, of the housing and a pair of side plates forming a left side and a right side, respectively, of the housing. The battery cells may include pouch-type battery cells, and be stacked and arranged such that broad surfaces of the battery cells are arranged to stand and accommodated such that outermost battery cells among the battery cells are arranged to face the pair of side plates in the housing, and the insulating materials may be arranged in contact with each side plate of the two battery modules facing each other.

The battery pack may further include an anti-compression body that is formed of a rigid material and penetrates through the insulating materials and the thermally conductive sheet to be arranged in contact with outer surfaces of the two battery modules with both ends facing each other.

The anti-compression body may be formed of a cured ceramic fiber.

In another aspect of the present disclosure, there is provided an electric vehicle including the above-described battery pack.

According to one aspect of the present disclosure, transfer of heat generated from some battery modules to other battery modules in the vicinity may be prevented or dissipated to a case having a relatively large thermal capacity, thereby effectively preventing thermal runaway propagation between the battery modules.

In detail, according to the present disclosure, when heat is generated from a battery module, transfer of heat between battery modules may be primarily prevented by using an insulating material, and a heat source going beyond the primary prevention by the insulating material may be dissipated to a case by using a thermally conductive sheet. Accordingly, according to this aspect of the present disclosure, thermal runaway propagation between the battery modules may be effectively prevented, thereby further improving the safety of the battery pack.

The effects of the present disclosure are not limited to the above-described effects, and effects not mentioned herein will be clearly understood by those of ordinary skill in the art to which the present disclosure belongs, from the present specification and accompanying drawings.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the configurations disclosed in the preferred embodiments and drawings of the present specification are examples of preferred embodiments of the present disclosure, and thus it should be understood that there can be alternative equivalents or modification examples that can replace the preferred embodiments at the point of the filing of the present application.

Figure 1:
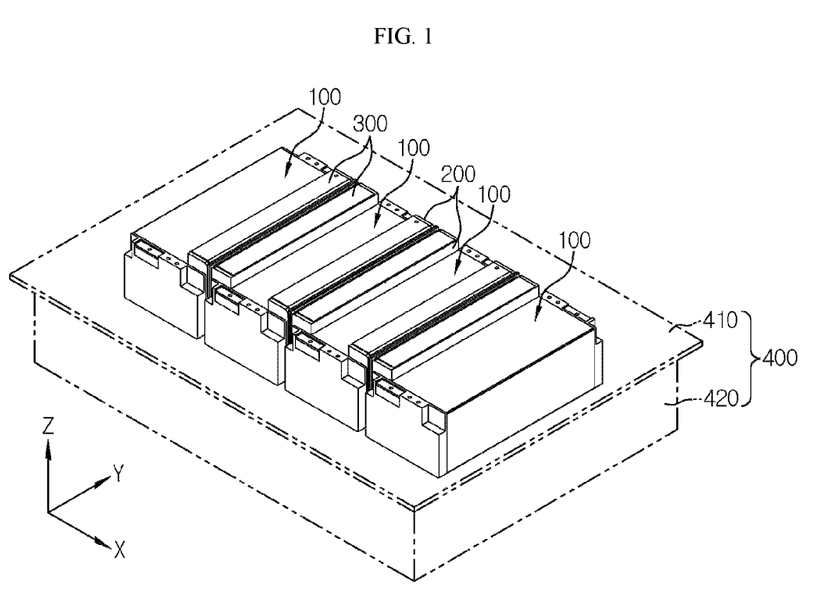
FIG. 1 is a schematic view of a battery pack in which insulating materials and a thermally conductive sheet, according to an embodiment of the present disclosure, are applied between battery modules.
Figure 2:
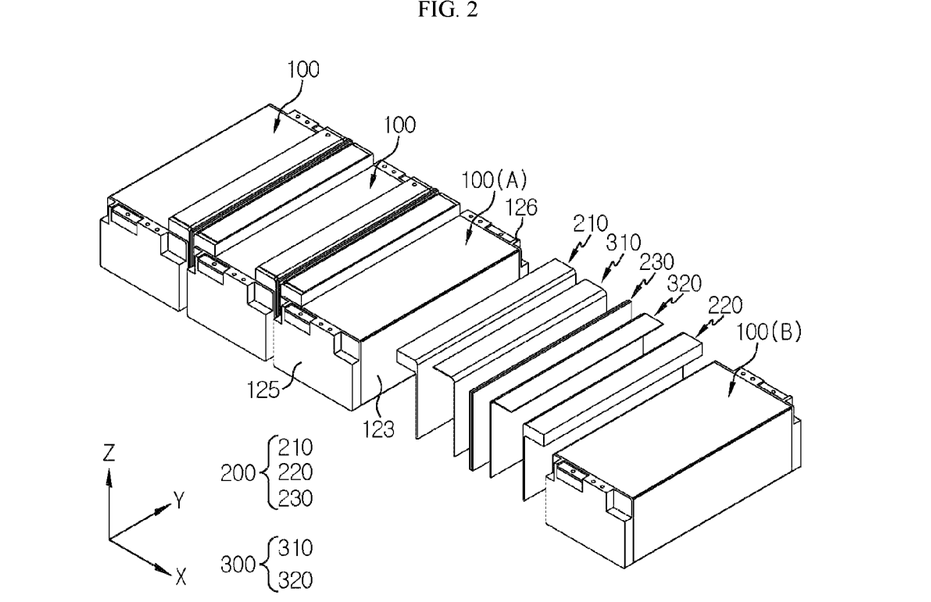
FIG. 2 illustrates a state in which the insulating materials and the thermally conductive sheet are separated in some battery modules of FIG. 1.

FIG. 1 is a schematic view of a battery pack in which insulating materials and a thermally conductive sheet are applied between battery modules, according to an embodiment of the present disclosure. FIG. 2 illustrates a state in which the insulating materials and the thermally conductive sheet are separated in some battery modules of FIG. 1.

As illustrated in these drawings, the battery pack according to an embodiment of the present disclosure may be configured to include a plurality of battery modules 100, a plurality of insulating materials 200, a thermally conductive sheet 300, and a case 400.

The battery modules 100 may include a plurality of battery cells 110. While a secondary battery, specifically, a pouch-type secondary battery is applied as the battery cell 110 according to the present embodiment, the battery module 100 is not necessarily configured as pouch-type secondary batteries. That is, the battery module 100 may be configured as a cylindrical or prismatic secondary battery.

The secondary battery may include an electrode assembly, an electrolyte, and an exterior material. The electrode assembly is an assembly of an electrode and a separator, and may be configured in a form in which one or more positive electrode plates and one or more negative electrode plates are arranged with a separator therebetween. In addition, each electrode plate of the electrode assembly may be provided with an electrode tab to be connected to an electrode lead. In particular, in a pouch-type secondary battery, one or more electrode tabs may be connected to an electrode lead, and the electrode lead may be arranged between pouch exterior materials such that one end of the electrode lead is exposed to the outside, and thus the electrode lead may function as an electrode terminal. The exterior material may have a hollow space therein to accommodate the electrode assembly and the electrolyte, and may be configured in a sealed form. The exterior material of a can-type secondary battery may be formed of a metal material, and the exterior material of a pouch-type secondary battery may include an external insulating layer, a metal layer, and an internal adhesive layer.

The configuration of the secondary batteries described above is obvious to those skilled in the art to which the present disclosure pertains, and thus a detailed description thereof will be omitted. In addition, various secondary batteries known at the time of filing of the present disclosure may be employed in the battery pack according to the present disclosure.

The battery module 100 may include a housing to accommodate the battery cells 110. The housing may constitute the exterior or an outer surface of the battery module 100, and the plurality of battery cells 110 may be accommodated in the housing.

In the present embodiment, the pouch-type battery cells 110 are arranged to stand and be stacked horizontally (±X-axis direction) to be accommodated in the housing. In this case, an outermost battery cell 110 in the stacking arrangement may be arranged to face a pair of side plates 123 and 124 to be described later. The energy density of each battery module 100 may be maximized according to the accommodation structure of the battery cells 110.

The housing may be formed in a substantially rectangular parallelepiped shape. The housing may include a top plate 121 and a bottom plate 122 forming an upper portion and a lower portion, respectively, and a right side plate 123 and a left side plate 124 forming a right side and a left side, respectively. In addition, the housing may be configured in a form in which front and rear ends are opened, a hollow inner space is formed to accommodate the battery cells 110, and a front cover 125 covering the front end and a rear cover 126 covering the rear end are included. A terminal may be provided on at least one of the front cover 125 and the rear cover 126.

The housing may be configured in a sealed form to protect the battery cells 110 accommodated therein from external physical and chemical factors. For example, as illustrated in FIG. 1, the housing may be configured in a form in which top, bottom, left, right, front, and rear portions thereof are closed to not expose the top, bottom, left, right, front, and rear portions of the battery cells 110 to the outside. According to the above configuration, the housing may be a component forming the outside of one battery module 100 and function as a boundary dividing the outside of the battery module 100 from the inside of the battery module 100.

The housing may include a rigid material such as metal, for securing mechanical rigidity, and an electrically insulating material for securing electrical insulation outside and inside the battery module 100. Moreover, the housing may be formed of other various materials or may further include other materials.

As illustrated in FIG. 1, a plurality of battery modules 100 may be accommodated in the case 400, which includes a tray 420 and a cover 410 provided to be coupled to each other. Although not shown for convenience of illustration, a battery management system (BMS), a cooling system, a battery disconnection unit (BDU), an electric wiring cable, and the like may be further accommodated in the case 400.

The plurality of battery modules 100 may be arranged horizontally (±X-axis direction) in a form in which side surfaces thereof face each other in the tray 420. That is, the plurality of battery modules 100 may be horizontally arranged with the right side plate 123 and the left side plate 124 facing each other.

The insulating material 200 may be arranged between the plurality of battery modules 100. For example, as illustrated in FIG. 2, the insulating material 200 may be arranged between every two battery modules 100 facing each other among the plurality of battery modules 100 included in the battery pack. That is, when N battery modules 100 are included in a battery pack, and the N battery modules 100 are arranged horizontally, N−1 insulating materials 200 may be arranged between every two battery modules 100.

The insulating material 200 may be formed of a material having high insulation and heat resistance characteristics. For example, a material such as foamed polystyrene or phenolic foam may be used to manufacture the insulating material 200. The insulating material 200 may be used to prevent heat generated in the battery module 100 from leaking to the outside or prevent heat from the outside from flowing into the battery module 100.

Therefore, even when heat is generated from some of the battery modules 100 included in the battery pack, propagation of the heat to other battery modules 100 in the vicinity may be blocked or considerably delayed.

Although the insulating material 200 is formed of a material having a very low thermal conductivity, it is not that heat conduction does not occur at all, and furthermore, there is a difference in insulation performance depending on the material or thickness of the insulating material 200.

Accordingly, the battery pack according to the present disclosure further includes the thermally conductive sheet 300 provided between the insulating materials 200.

The thermally conductive sheet 300 includes heat dissipating portions 310b and 320b provided in a form in which a top portion thereof is bent and extended to be in surface contact with an inner surface of the case 400, and dissipates heat propagated from any one battery module 100 over the insulating material 200 to elsewhere with a large thermal capacity, thereby preventing or further delaying heat propagation to other battery modules 100.

In detail, an example in which the insulating material 200 and the thermally conductive sheet 300 are applied together between the battery modules 100 according to an embodiment of the present disclosure will be described in detail with reference to FIGS. 2 to 6.

Hereinafter, for convenience of description, two battery modules 100 which are adjacent to each other and face each other will be arbitrarily selected from among the battery modules 100 included in the battery pack, and the left one will be referred to as a first battery module 100A, and a right one will be referred to as a second battery module 100B.

First, as illustrated in FIG. 2, the insulating material 200 according to the present embodiment includes a first insulation pad 210, a second insulation pad 220, and a third insulation pad 230.

The first insulation pad 210 may be provided in a form that may surround the entire right side plate 123 and at least a portion of the top plate 121 of the first battery module 100A, and in a symmetrical structure to the first insulation pad 210, the second insulation pad 220 may be provided in a form that may surround the entire left side plate 124 and at least a portion of the top plate 121 of the second battery module 100B.

Figure 3:
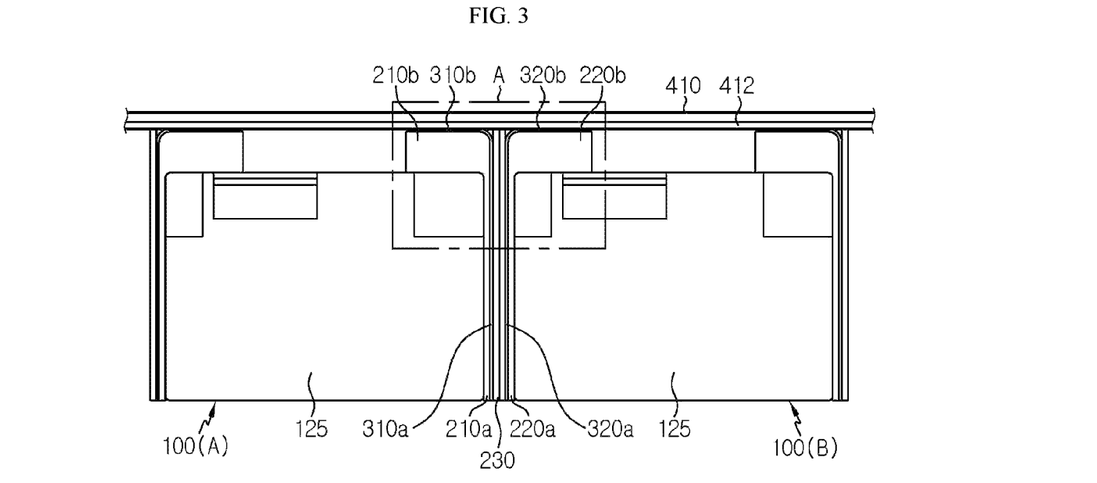
FIG. 3 is a front view from a front side of some battery modules inside a battery pack, according to an embodiment of the present disclosure.
Figure 4:
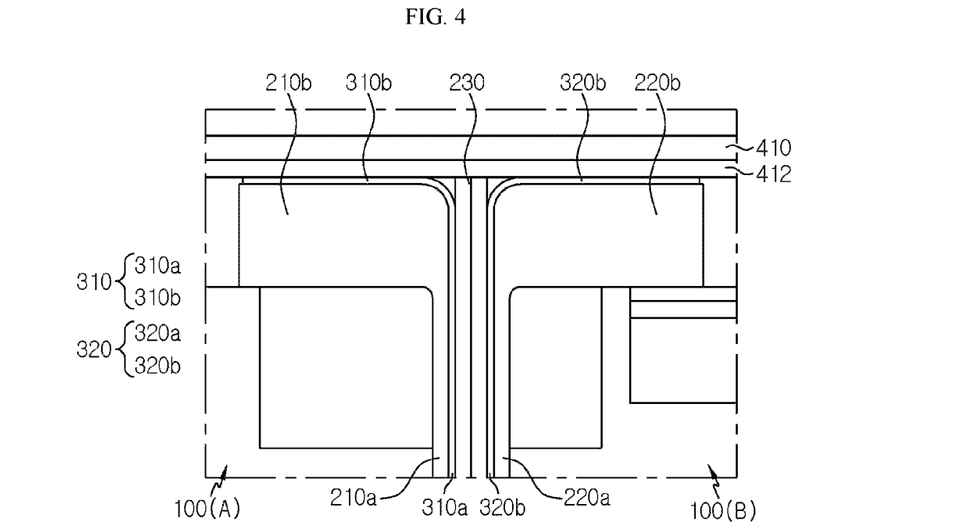
FIG. 4 is an enlarged view of region A of FIG. 3.
Figure 5:
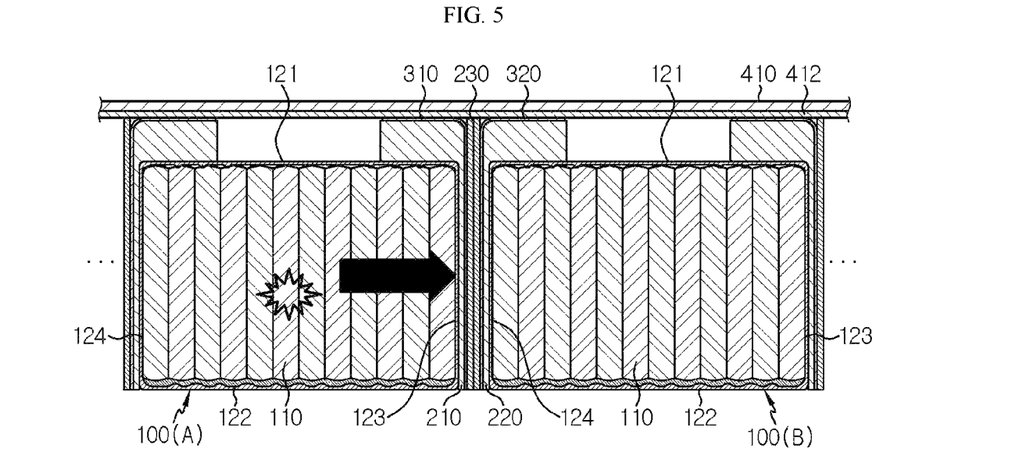
FIG. 5 is a partial cross-sectional view of a battery pack that illustrates an insulation and heat dissipation structure between battery modules, according to an embodiment of the present disclosure.
Figure 6:
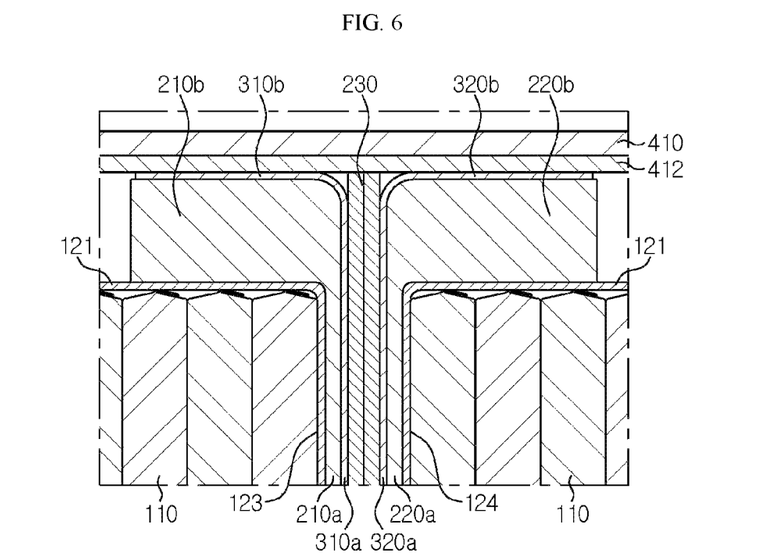
FIG. 6 is an enlarged partial view of the battery pack of FIG. 5.

As illustrated in FIGS. 3 through 5, the first insulation pad 210 and the second insulation pad 220 may include wall portions 210a and 220a, respectively, formed with areas corresponding to the side plates 123 and 124, respectively, and bent portions 210b and 220b bent at the upper ends of the wall portions 210a and 220a, respectively, and arranged in parallel to the top plate 121.

According to the configuration of the wall portions 210a and 220a and the bent portions 210b and 220b, the inflow and outflow of heat through the entire side plates 123 and 124 and corner areas connected to the side plates 123 and 124 and the top plate 121 may be blocked.

In addition, the bent portions 210b and 220b may be arranged on the top plate 121, and the bent portions 210b and 220b may be provided to be thicker than the wall portions 210a and 220a, respectively. The bent portions 210b and 220b may act as a cushioning material protecting the battery modules 100 from vibration or impact that may be transmitted from the cover 410.

In addition, as the first insulation pad 210 and the second insulation pad 220 are provided with the bent portions 210b and 220b on the upper portion thereof, when the first insulation pad 210 and the second insulation pad 220 are arranged between the battery modules 100, they may be mounted on the upper left portion and the upper right portion of the battery modules 100. This works as an advantage in terms of assembly convenience, as the above feature allows to place the first insulation pad 210 on the first battery module 100A and the second insulation pad 220 on the second battery module 100B and easily attach the same to each other.

The third insulation pad 230 may be provided in a rectangular plate shape and arranged between the first insulation pad 210 and the second insulation pad 220. The third insulation pad 230 has a function of blocking heat exchange between a first thermally conductive sheet 310 and a second thermally conductive sheet 320 to be described later.

As illustrated in to FIGS. 2 through 6, the thermally conductive sheet 300 according to the present embodiment includes the first thermally conductive sheet 310 and the second thermally conductive sheet 320, and may include a material having a thermal conductivity of 200 W/mK or more. As the material of the thermally conductive sheet 300, for example, aluminum (Al) or graphite may be used. It may be regarded that using graphite, which is a non-metal based material, is advantageous in terms of electrical insulation. However, aluminum may be used as an alternative to graphite, or graphite and aluminum may be used in combination.

The first thermally conductive sheet 310 may be arranged between the first insulation pad 210 and the third insulation pad 230, and the second thermally conductive sheet 320 may be arranged between the second insulation pad 220 and the third insulation pad 230.

In addition, the first thermally conductive sheet 310 may include a first heat absorbing portion 310a in contact with one surface of the first insulation pad 210 and one surface of the third insulation pad 230, and a first heat dissipating portion 310b in contact with the upper surface of the first insulation pad 210 and the inner surface of the case 400.

The first heat absorbing portion 310a may be configured to be in surface contact with the wall portion 210a of the first insulation pad 210 and the left side of the third insulation pad 230, and the first heat dissipating portion 310b may be configured to be in surface contact with an inner surface of the cover 410.

According to the above configuration, for example, when heat is generated in the first battery module 100A, heat passing over the first insulation pad 210 is absorbed by the first heat absorbing portion 310a and rapidly discharged to the cover 410 through the first dissipating portion 310b. As the cover 410 is a structure having a relatively large thermal capacity as compared to the first battery module 100A, the cover 410 may be sufficient to absorb the heat of the first thermally conductive sheet 310.

A heat transfer material 412 may be further provided on the inner surface of the cover 410. Here, the inner surface of the cover 410 refers to the entire cover 410. That is, the inner surface of the cover 410 includes both a portion that is in contact with the first heat dissipating portion 310b and a portion not in contact with the first heat dissipating portion 310b. For example, the entire inner surface of the cover 410 may be coated with graphite to evenly distribute the heat absorbed from the first heat dissipation unit 310b throughout the cover 410 to prevent a local temperature rise.

That is, the heat of the first battery module 100A is primarily blocked by the first insulation pad 210, and the heat passing over the first insulation pad 210 is discharged to the cover 410 located above the battery modules 100 through the first thermally conductive sheet 310. Furthermore, as the third insulation pad 230 is located on the right side of the first thermally conductive sheet 310, the heat passing over the first insulation pad 210 may be secondarily blocked by the third insulation pad 230.

The second thermally conductive sheet 320 may include a second heat absorbing portion 320a that is in contact with one surface of the second insulation pad 220 and the other surface of the third insulation pad 230 and a second heat dissipating portion 320b in contact with an upper surface of the second insulation pad 220 and the inner surface of the case 400.

The second heat absorbing portion 320a may be configured to be in surface contact with the wall portion 220a of the second insulation pad 220 and the right side of the third insulation pad 230, and the second heat dissipating portion 320b may be configured to be in surface contact with the inner surface of the cover 410.

According to the above configuration, when heat is generated from the first battery module 100A, the heat passing over the third insulation pad 230 is blocked from moving to the second battery module 100B by the second insulation pad 220 and may be absorbed by the second heat absorbing portion 320a and rapidly discharged to the cover 410 through the second heat dissipating portion 320b.

In sum, the first insulation pad 210, the first thermally conductive sheet 310, the third insulation pad 230, the second thermally conductive sheet 320, and the second insulation pad 220 are provided between the first battery module 100A and the second battery module 100B. Thus, heat of the first battery module 100A reaches the second battery module 100B only through five steps, which are in the order from primary insulation, primary heat dissipation, secondary insulation, secondary heat dissipation, and tertiary insulation. However, most of the heat is blocked or escapes to the outside in the process of the above five steps, and the heat reaching the second battery module 100B may be regarded as insignificant.

As described above, according to the configuration and operation of the present disclosure, even if a problem occurs in some battery modules 100 included in the battery pack and the temperature rises, movement of the heat source to the adjacent battery modules 100 may be effectively prevented. Accordingly, thermal runaway of all battery modules 100 included in the battery pack may be blocked, and secondary accidents such as explosion of the battery pack may be prevented.

Figure 7:
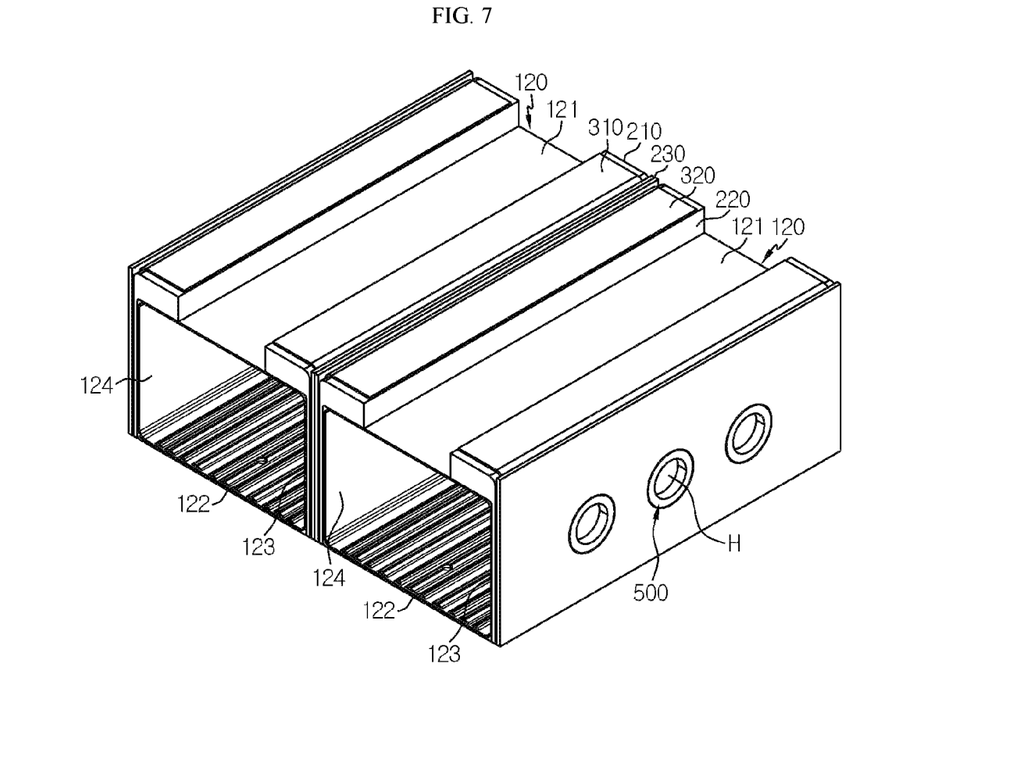
FIG. 7 is an illustration of an example in which an anti-compression body is applied to a battery pack according to another embodiment of the present disclosure.

A battery pack according to another embodiment of the present disclosure will now be described with reference to FIGS. 7 through 9.

The same reference numerals as those in the previous embodiments denote the same members, and repeated description of the same members will be omitted, and description will focus on differences from the above-described embodiments.

Compared with the above-described embodiments, the battery pack according to the present embodiment is characterized in that the battery pack further includes an anti-compression member 500, and the rest of the configuration is substantially the same as that of the above-described embodiments.

As the use of the battery pack continues, a swelling phenomenon may occur in the battery cells 110 included in the battery module 100. Due to the swelling of the battery cells 110, a portion of the battery module 100 may be inflated. In this case, when the insulating material 200 between the battery modules 100 is compressed, the heat blocking ability of the insulating material 200 may be significantly reduced. In other words, since the typical insulating material 200 has a porous structure in which the heat insulating properties of air in the pores is used, when the insulating material 200 is compressed, the porous structure may be broken and the heat blocking ability may be degraded.

As described above, the anti-compression body 500 performs a function of preventing compression of the insulating material 200 due to inflation of a portion of the battery module 100.

The anti-compression body 500 is formed of a rigid material and penetrates through the insulating materials 200 and the thermally conductive sheet 300 and is arranged to be in contact with outer surfaces of the two battery modules 100 with both ends facing each other. For example, the anti-compression body 500 may be provided through a curing process by vacuum-molding a ceramic fiber material into a pipe or tube shape.

The anti-compression body 500 according to the present embodiment may include two parts including a first anti-compression body 510 and a second anti-compression body 520. In addition, each of the first insulation pad 210, the first thermally conductive sheet 310, the third insulation pad 230, the second thermally conductive sheet 320, and the second insulation pad 220 according to the present embodiment may include through holes H provided to insert the first anti-compression body 510 or the second anti-compression member 520. Here, the third insulation pad 230 may include two sheets.

The first anti-compression body 510 and the second anti-compression body 520 may each include an insertion limiting portion P2 and an insertion tube portion P1. The insertion limiting portion P2 may be provided to have a larger diameter than the through holes H, and the insertion tube portion P1 may be provided to have a smaller diameter than the through holes H.

Figure 8:
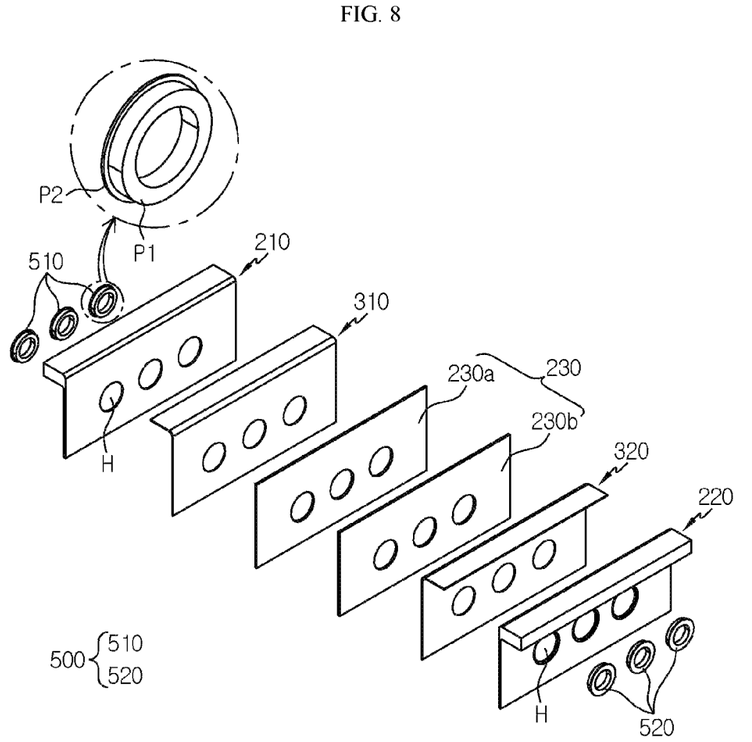
FIG. 8 is an exploded perspective view of insulating materials, a thermally conductive sheet, and an anti-compression body, according to another embodiment of the present disclosure.

As illustrated in FIG. 8, the first anti-compression member 510 may be inserted into the through holes H in the order from the first insulation pad 210, the first thermally conductive sheet 310, and to one sheet of the third insulation pad 230, from left to right, and the second anti-compression body 520 may be inserted into the through holes H in the order from the second insulation pad 220, the second thermally conductive sheet 320, and to the other sheet of the third insulation pad 230, from right to left.

Ends of each of the insertion tube portion P1 of the first anti-compression body 510 and the insertion tube portion P1 of the second anti-compression body 520 which are inserted in the above-described manner may be in contact with each other. Here, an adhesive tape or the like may be attached to the ends of any one of the insertion tube portions P1 to prevent the same from falling off easily.

In addition, each of the first insulation pad 210 and the second insulation pad 220 may be formed such that circumferences of the through holes H are recessed by a thickness of the insertion limiting portion P2. In this case, when the first anti-compression member 510 and the second anti-compression member 520 are inserted into the first insulation pad 210 and the second insulation pad 220, respectively, the insertion limiting portion P2 of the first anti-compression member 510 may not protrude from one surface of the first insulation pad 210, and the insertion limiting portion P2 of the second anti-compression body 520 may not protrude from one surface of the second insulation pad 220.

Figure 9:
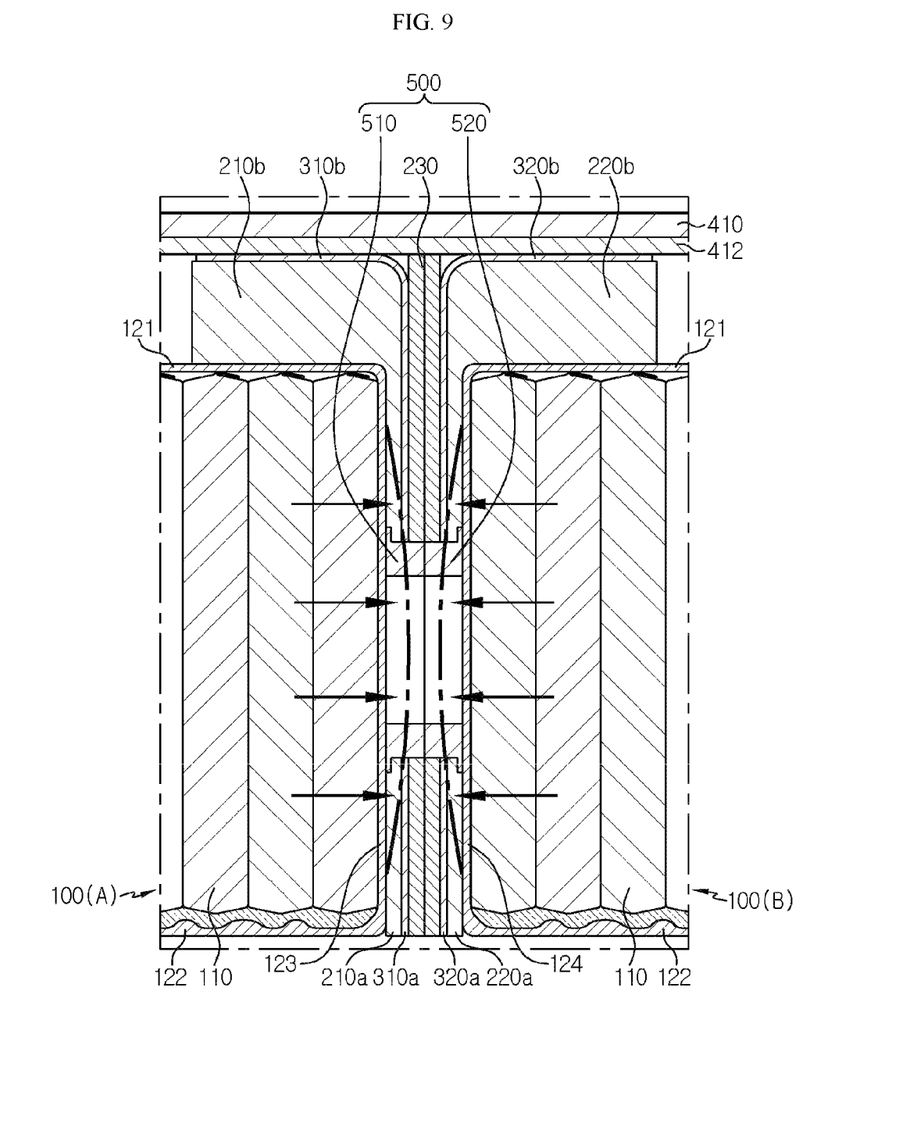
FIG. 9 is a partial cross-sectional view of a battery pack that illustrates an insulation and heat dissipation structure between battery modules, according to another embodiment of the present disclosure.

When the insulating materials 200 and the anti-compression body 500 are arranged between the first battery module 100A and the second battery module 100B in the above-described configuration, as illustrated in FIG. 9, one surface of the first insulation pad 210 and the insertion limiting portion P2 of the first anti-compression body 510 may be in contact with the right side plate 123 of the first battery module 100A without a step, and also, one surface of the second insulation pad 220 and the insertion limiting portion P2 of the second anti-compression body 520 may be in contact with the left side plate 124 of the second battery module 100B without a step.

Thus, when the battery cells 110 inside the first battery module 100A to the battery cells 110 inside the second battery module 100B swell, the anti-compression member 500 may support the right side plate 123 of the first battery module 100A and the left side plate 124 of the second battery module 100B. Accordingly, the insulating materials 200 may be always maintained in an uncompressed original state, and thus, when heat is generated from the first battery module 100A, the heat may be stably blocked to prevent thermal runaway propagation to the second battery module 100B.

The battery pack according to the present disclosure may be applied to a vehicle such as an electric vehicle or a hybrid vehicle. That is, a vehicle according to the present disclosure may include the battery pack according to the present disclosure. In particular, battery packs of electric vehicles, for example, may include a large number of secondary batteries, and according to the present disclosure, even when heat is generated from any one secondary battery, propagation of thermal runaway of the heat from the battery module 100 in which the above one secondary battery is included, to other battery modules 100 in the vicinity may be effectively prevented.

According to the battery pack having the above-described configuration, when an event such as heat generation or flames occurs in a certain battery module 100, thermal runaway propagation to other battery modules 100 in the vicinity may be prevented or sufficiently delayed, thereby ensuring time required for user safety and measures for preventing secondary accidents.

In the present specification, while terms indicating directions such as up, down, left, right, front, and back, etc. have been used, it will be obvious to those skilled in the art that these terms are only for convenience of description and may be expressed differently depending on the location of the object or the viewing position of the observer.

As described above, while the present disclosure has been described with reference to limited embodiments and drawings, the present disclosure is not limited thereto, and various modifications and variations may be made by those of ordinary skill in the art to which the present disclosure pertains within the scope of the present disclosure and the claims described below and equivalents thereof.

What is claimed is:

1. A battery pack comprising:
    a plurality of battery modules comprising a plurality of battery cells and a housing accommodating the plurality of battery cells;
    a case accommodating the plurality of battery modules;
    a plurality of insulating materials arranged between two adjacent battery modules among the plurality of battery modules facing each other; and
    a thermally conductive sheet, wherein a portion of the thermally conductive sheet is arranged between the plurality of insulating materials and another portion of the thermally conductive sheet is in contact with the case,
    wherein the plurality of insulating materials comprise a first insulation pad provided to surround one side and a portion of an upper surface of a first battery module of the two adjacent battery modules facing each other; a second insulation pad provided to surround one side and an upper surface of a second battery module of the two adjacent battery modules facing each other; and a third insulation pad arranged between the first insulation pad and the second insulation pad.

2. The battery pack of claim 1, wherein the case comprises a heat transfer material on an inner surface thereof, and
    the thermally conductive sheet comprises a heat dissipating portion having a bent upper portion which is in contact with the inner surface of the case.

3. The battery pack of claim 1, wherein the thermally conductive sheet comprises:
    a first thermally conductive sheet arranged between the first insulation pad and the third insulation pad; and
    a second thermally conductive sheet arranged between the second insulation pad and the third insulation pad.

4. The battery pack of claim 3, wherein the first thermally conductive sheet and the second thermally conductive sheet are symmetrical to each other.

5. The battery pack of claim 4, wherein the first thermally conductive sheet comprises a first heat absorbing portion in contact with a surface of the first insulation pad and a first surface of the third insulation pad and a first heat dissipating portion in contact with an upper surface of the first insulation pad and an inner surface of the case, and
    the second thermally conductive sheet comprises a second heat absorbing portion in contact with a surface of the second insulation pad and a second surface of the third insulation pad and a second heat dissipating portion in contact with an upper surface of the second insulation pad and the inner surface of the pack case.

6. The battery pack of claim 1, wherein the thermally conductive sheet comprises a material having a thermal conductivity of 200 W/mk or more.

7. The battery pack of claim 6, wherein the thermally conductive sheet comprises at least one material selected from aluminum (Al) and graphite.

8. The battery pack of claim 1, wherein the housing comprises:
    a top plate, a bottom plate and a pair of side plates, which form an upper portion, a lower portion and left and right side portions of the housing, respectively,
    wherein the plurality of battery cells comprises pouch battery cells,
    wherein the plurality of battery cells are arranged such that the plurality of battery cells are stacked along broad surfaces of the battery cells and outermost battery cells among the plurality of battery cells are arranged to face the pair of side plates in the housing, and
    wherein the plurality of insulating materials are in contact with each side plate of the two adjacent battery modules facing each other.

9. The battery pack of claim 1, further comprising an anti-compression body,
    wherein the anti-compression body comprises a rigid material, and
    wherein the anti-compression body penetrates through the plurality of insulating materials and the thermally conductive sheet and is in contact with outer surfaces of the two adjacent battery modules facing each other.

10. The battery pack of claim 9, wherein the anti-compression body comprises a cured ceramic fiber.

11. A vehicle comprising the battery pack according to claim 1.

* * * * *